US010555195B2

(12) United States Patent
Yi et al.

(10) Patent No.: US 10,555,195 B2
(45) Date of Patent: Feb. 4, 2020

(54) METHOD FOR PERFORMING UPLINK PACKET MEASUREMENTS IN A WIRELESS COMMUNICATION SYSTEM AND A DEVICE THEREFOR

(71) Applicant: LG ELECTRONICS INC., Seoul (KR)

(72) Inventors: Seungjune Yi, Seoul (KR); Sunyoung Lee, Seoul (KR); Hyunjin Shim, Seoul (KR)

(73) Assignee: LG Electronics Inc., Seoul (KR)

( * ) Notice: Subject to any disclaimer, the term of this patent is extended or adjusted under 35 U.S.C. 154(b) by 18 days.

(21) Appl. No.: 15/749,394

(22) PCT Filed: Jul. 19, 2016

(86) PCT No.: PCT/KR2016/007851
§ 371 (c)(1),
(2) Date: Jan. 31, 2018

(87) PCT Pub. No.: WO2017/026686
PCT Pub. Date: Feb. 16, 2017

(65) Prior Publication Data
US 2019/0141550 A1    May 9, 2019

Related U.S. Application Data

(60) Provisional application No. 62/202,899, filed on Aug. 9, 2015.

(51) Int. Cl.
*H04W 24/08*    (2009.01)
*H04W 24/10*    (2009.01)
(Continued)

(52) U.S. Cl.
CPC ......... *H04W 24/08* (2013.01); *H04L 43/0852* (2013.01); *H04W 24/10* (2013.01); *H04W 88/02* (2013.01)

(58) Field of Classification Search
CPC ..... H04W 24/08; H04W 24/10; H04W 88/02; H04L 12/4625; H04L 43/00; H04L 43/085
(Continued)

(56) References Cited

U.S. PATENT DOCUMENTS 6,694,135 B1 * 2/2004 Oksala .................. H04W 74/06
                                                                455/424
9,491,075 B2 * 11/2016 Lee ..................... H04L 43/0852
(Continued)

FOREIGN PATENT DOCUMENTS

EP            2887726 A1      6/2015
WO      2014/084499 A1       6/2014
(Continued)

*Primary Examiner* — Afsar M Qureshi
(74) *Attorney, Agent, or Firm* — Dentons US LLP

(57) ABSTRACT

The present invention relates to a wireless communication system. More specifically, the present invention relates to a method and a device for performing UL packet measurements in a wireless communication system, the method comprising: receiving a measurement configuration including a measurement period and a report unit from an eNB, performing an UL Packet Measurement per the report unit using the measurement period, and generating an UL Packet Measurement report including at least one ID of the report unit and at least one result of the UL Packet Measurement corresponding to the at least one ID of the report unit, and transmitting the UL Packet Measurement report to the eNB.

12 Claims, 10 Drawing Sheets

(51) Int. Cl.
  *H04L 12/26*  (2006.01)
  *H04W 88/02*  (2009.01)
(58) Field of Classification Search
  USPC .......................................................... 370/252
  See application file for complete search history.

(56) References Cited

U.S. PATENT DOCUMENTS

| | | | |
|---|---|---|---|
| 2009/0103478 A1* | 4/2009 | Sammour | H04L 1/1874 370/328 |
| 2009/0135773 A1* | 5/2009 | Aghili | H04L 1/003 370/329 |
| 2011/0085566 A1* | 4/2011 | Bucknell | H04L 47/10 370/412 |
| 2011/0170495 A1* | 7/2011 | Earnshaw | H04W 72/02 370/329 |
| 2015/0207712 A1* | 7/2015 | Fang | H04L 43/106 370/252 |

FOREIGN PATENT DOCUMENTS

| | | | |
|---|---|---|---|
| WO | 2014084499 | * | 6/2014 |
| WO | 2015/060544 A1 | | 4/2015 |

* cited by examiner

[Fig. 2A]
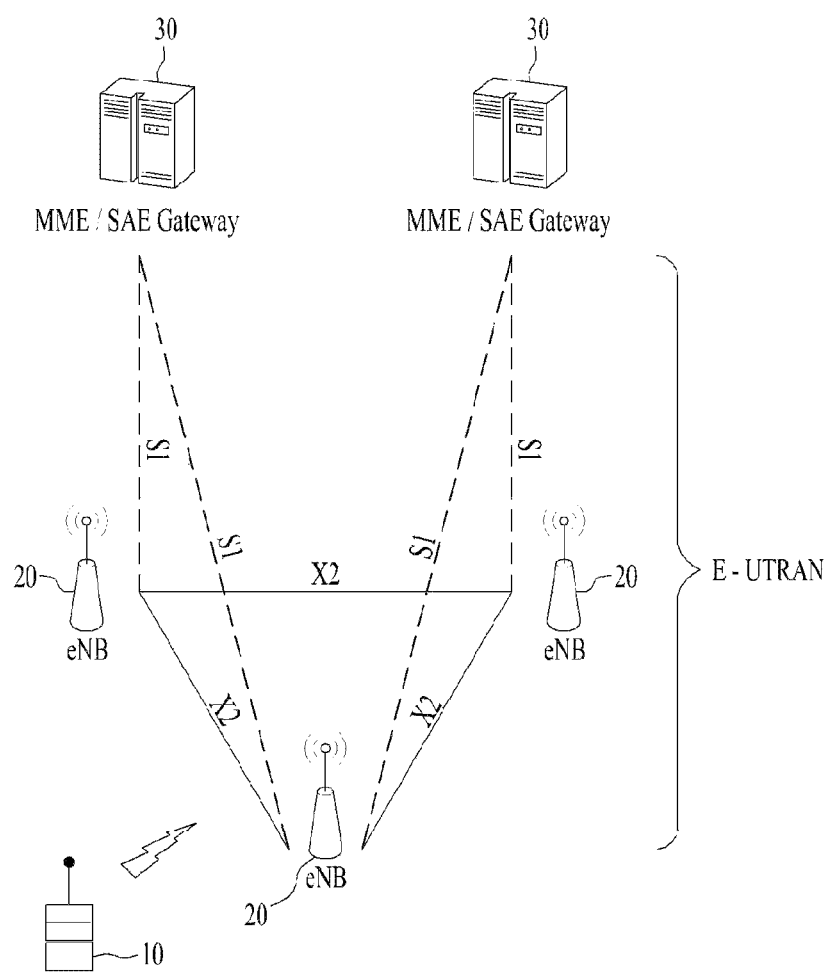

[Fig. 2B]
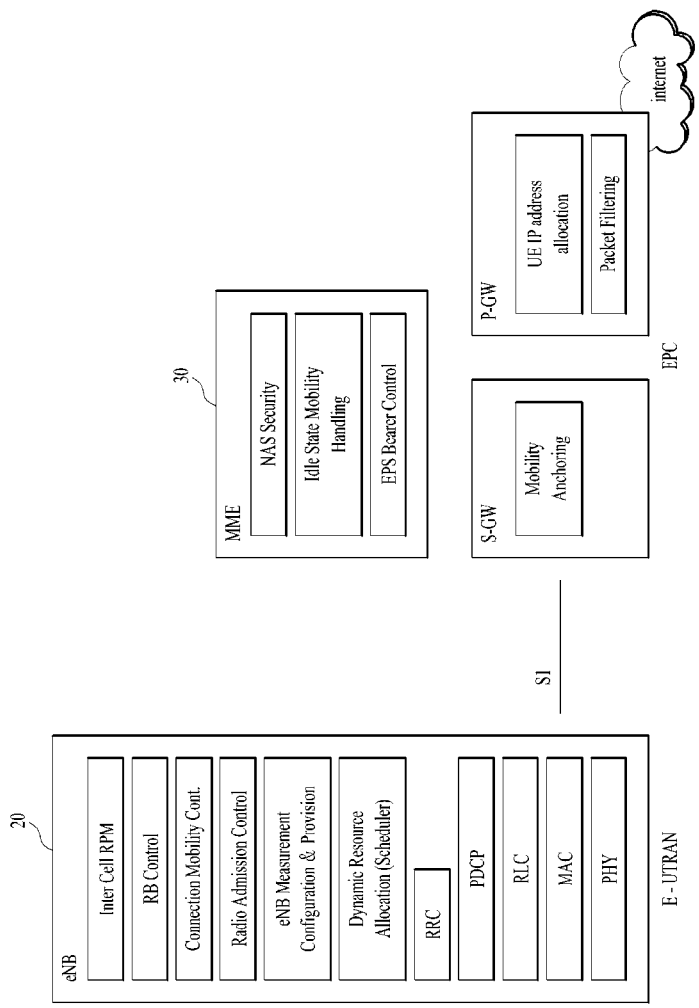
[Fig. 3]
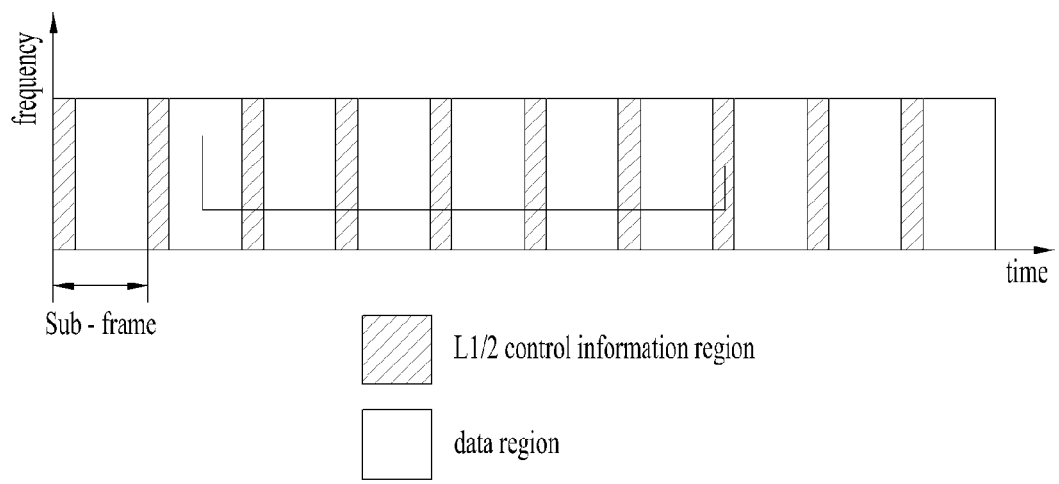

[Fig. 4]
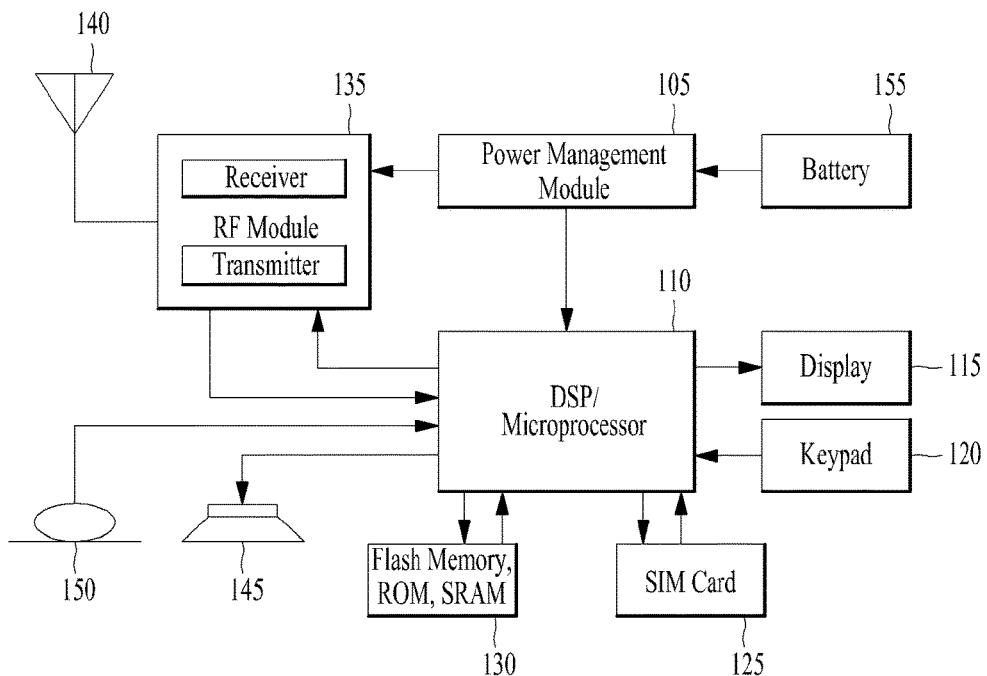
[Fig. 5]
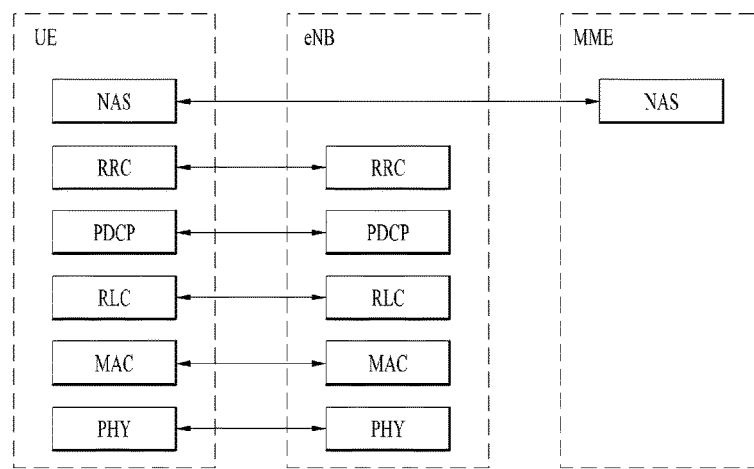
(a) Control-Plane Protocol Stack
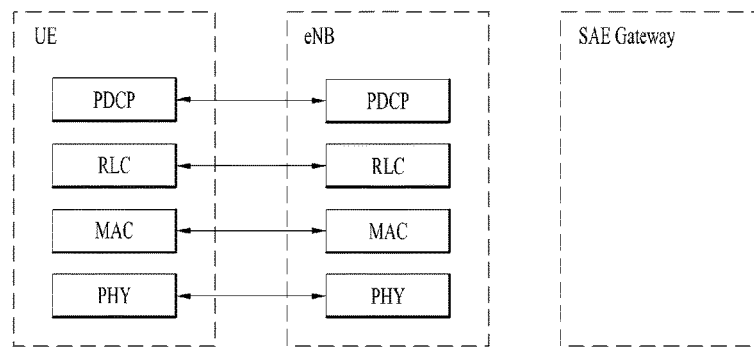
(b) User-Plane Protocol Stack

[Fig. 6]
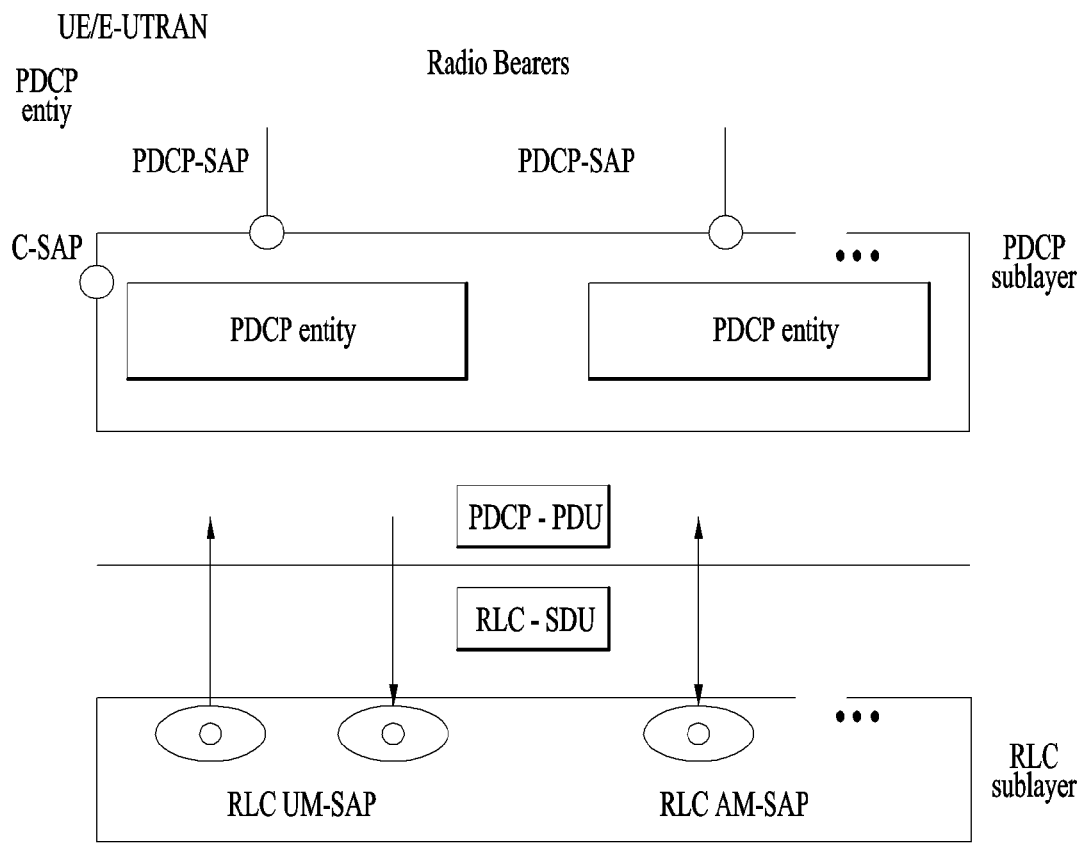

[Fig. 7]
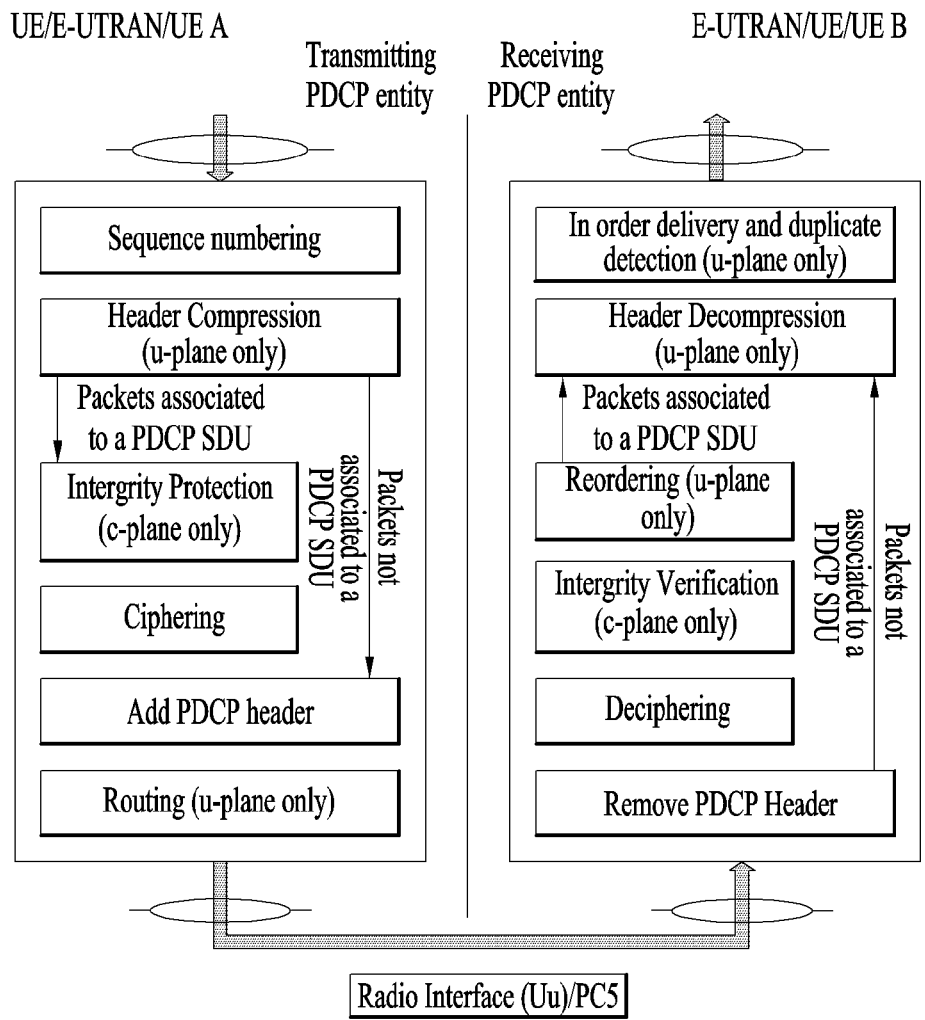

[Fig. 8]
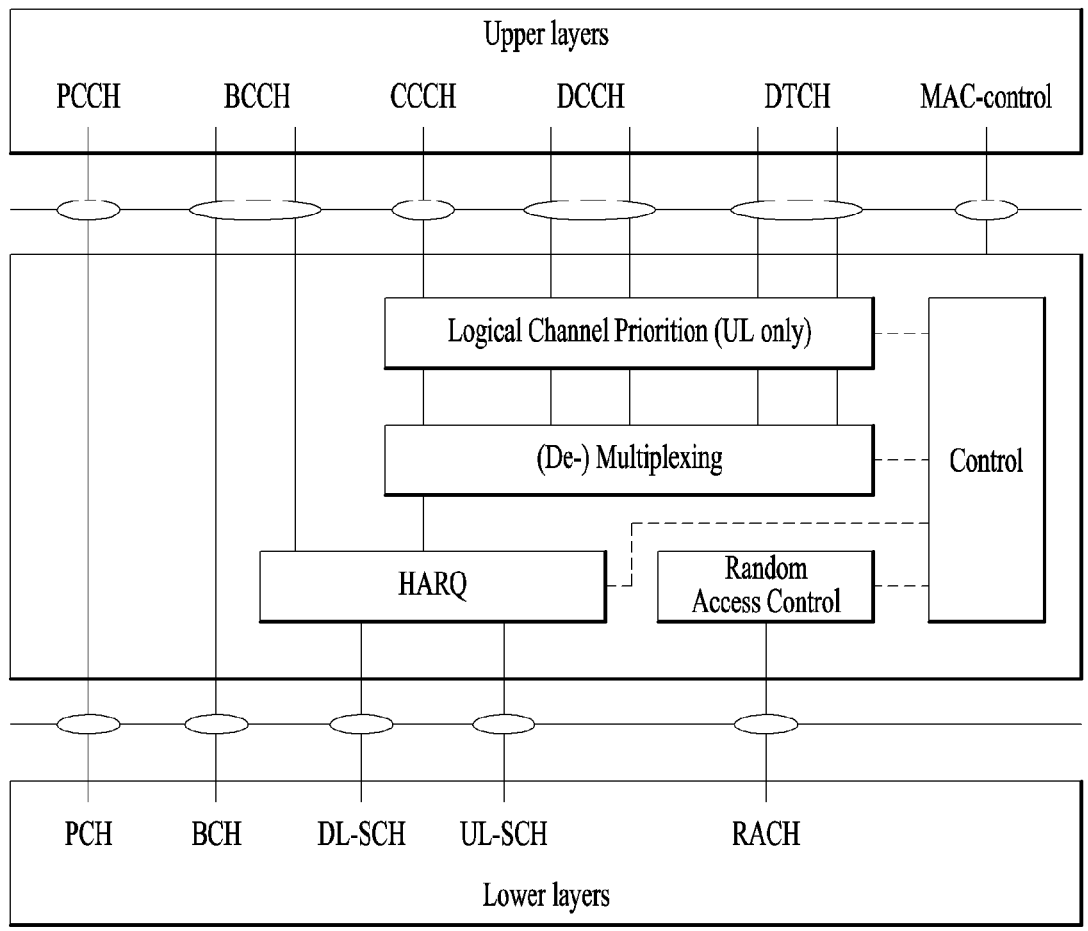
[Fig. 9A]
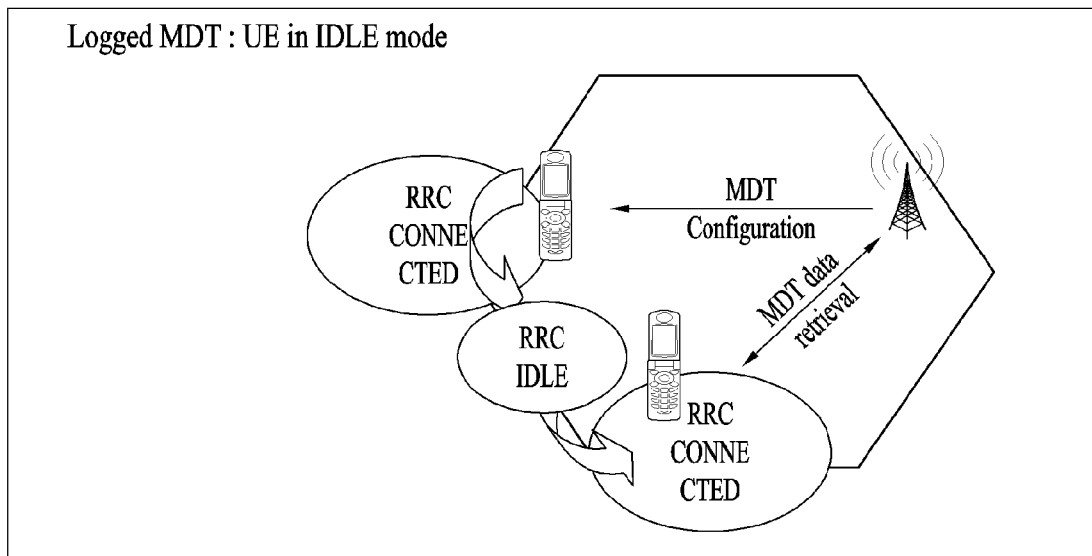

[Fig. 9B]
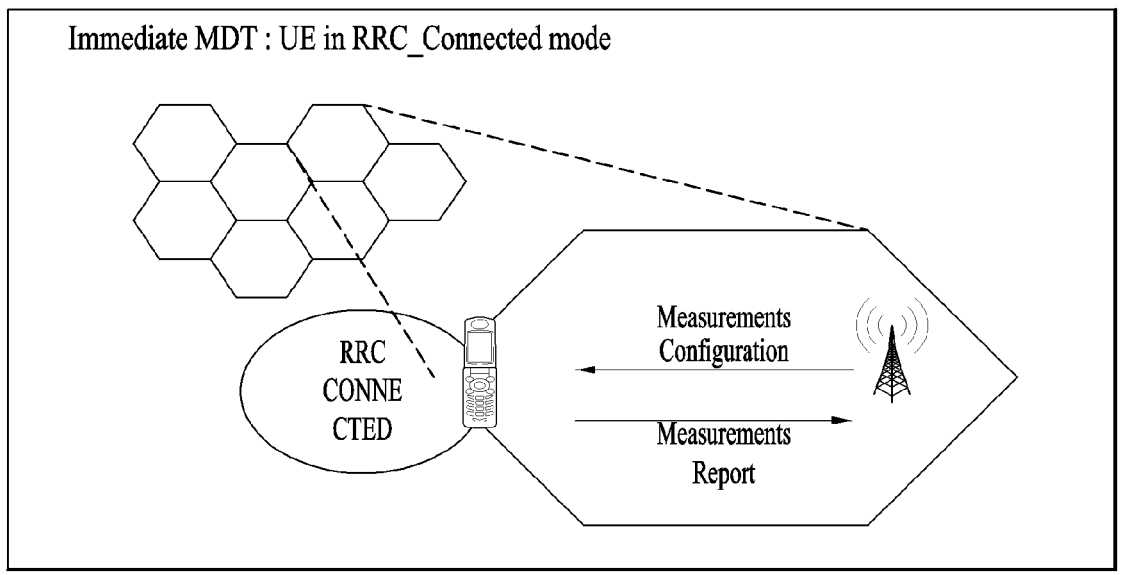
[Fig. 10A]
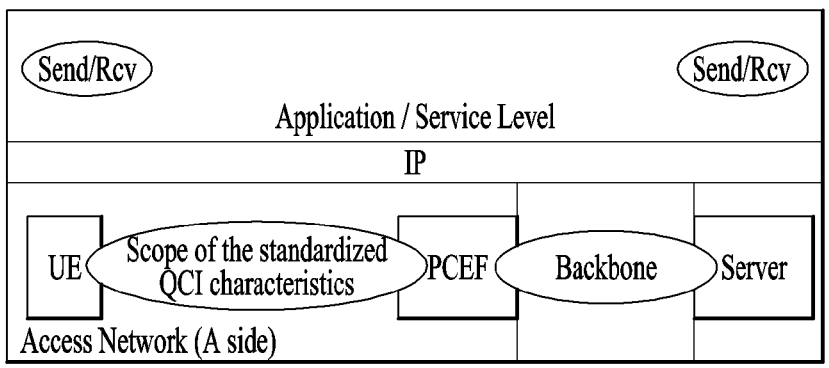
[Fig. 10B]
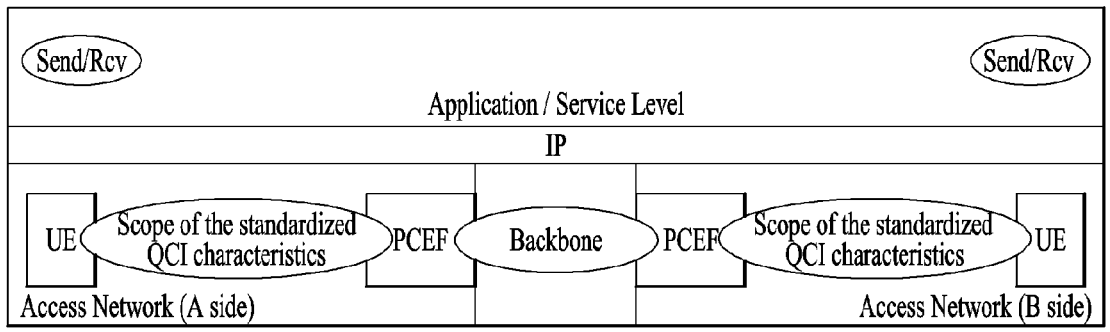

[Fig. 11]
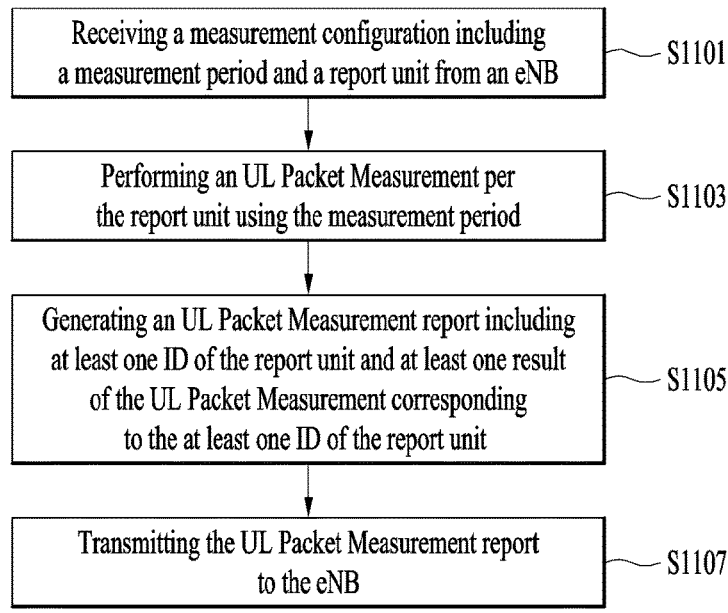
[Fig. 12]
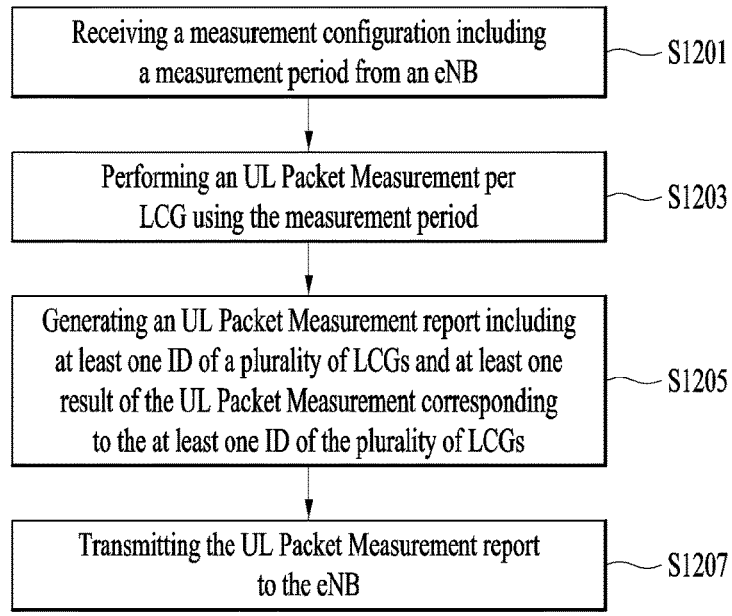
[Fig. 13]
| RB-1 | 110 |
| RB-3 | 200 |
| RB-4 | 150 |
| RB-7 | 300 |
| RB-9 | 240 |
| RB-10 | 135 |

[Fig. 14]
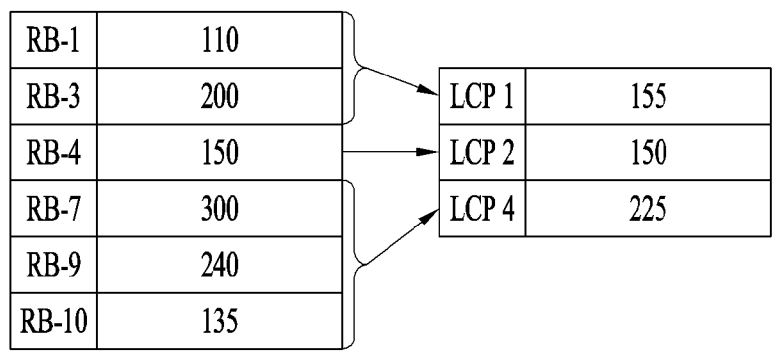
[Fig. 15]
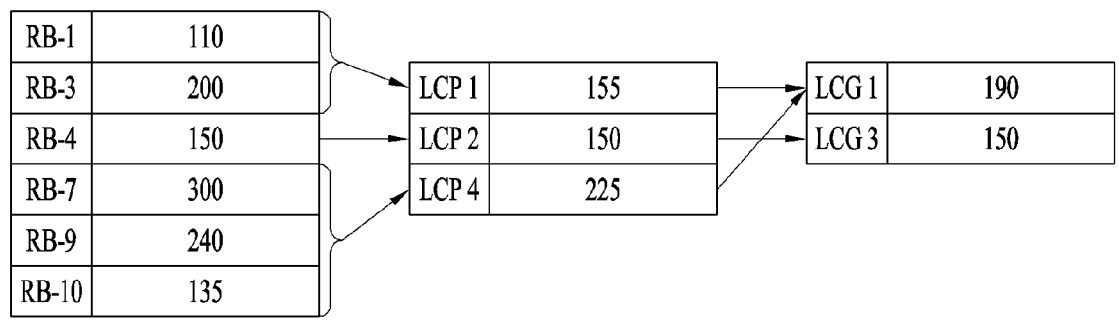

METHOD FOR PERFORMING UPLINK PACKET MEASUREMENTS IN A WIRELESS COMMUNICATION SYSTEM AND A DEVICE THEREFOR

This application is a 35 USC § 371 National Stage entry of International Application No. PCT/KR2016/007851 filed on Jul. 19, 2016, and claims priority to U.S. Provisional Application No. 62/202,899 filed on Aug. 9, 2015, all of which are hereby incorporated by reference in their entireties as if fully set forth herein.

TECHNICAL FIELD

The present invention relates to a wireless communication system and, more particularly, to a method for performing uplink (UL) packet measurements in a wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a LongTermEvolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for performing UL packet measurements in a wireless communication system. The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

In order to report measurement in Minimization of Drive Tests (MDT), it is invented that when a UE reports UL packet measurements to the eNB, the UE reports the UL Packet Measurement Report per Radio Bearer (RB), per logical channel priority (LCP), or per logical channel group (LCG).

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 2A is a block diagram illustrating network structure of an evolved universal mobile telecommunication system (E-UMTS), and FIG. 2B is a block diagram depicting architecture of a typical E-UTRAN and a typical EPC;

FIG. 3 is a view showing an example of a physical channel structure used in an E-UMTS system;

FIG. 4 is a block diagram of a communication apparatus according to an embodiment of the present invention;

FIG. 5 is a diagram showing a control plane and a user plane of a radio interface protocol between a UE and an E-UTRAN based on a 3rd generation partnership project (3GPP) radio access network standard;

FIG. 6 is a conceptual diagram for a PDCP entity architecture;

FIG. 7 is a conceptual diagram for functional view of a PDCP entity;

FIG. 8 is a diagram for MAC structure overview in a UE side;

FIG. 9A is a conceptual diagram for Logged MDT, and FIG. 9B is a conceptual diagram for Immediate MDT;

FIG. 10A shows scope of the Standardized QCI characteristics for client/server communication, and FIG. 10B shows scope of the Standardized QCI characteristics for peer/peer communication;

FIG. 11 is conceptual diagram for a UE operation regarding UL Packet Measurement report according to an exemplary embodiment of the present invention;

FIG. 12 is conceptual diagram for a UE operation regarding UL Packet Measurement report per LCG according to an exemplary embodiment of the present invention;

FIG. 13 shows an example of an UL Packet Measurement report per RB according to an exemplary embodiment of the present invention;

FIG. 14 shows an example of an UL Packet Measurement report per LCP according to an exemplary embodiment of the present invention; and FIG. 15 shows an example of an UL Packet Measurement report per LCG according to an exemplary embodiment of the present invention.

BEST MODE

Figure 1:
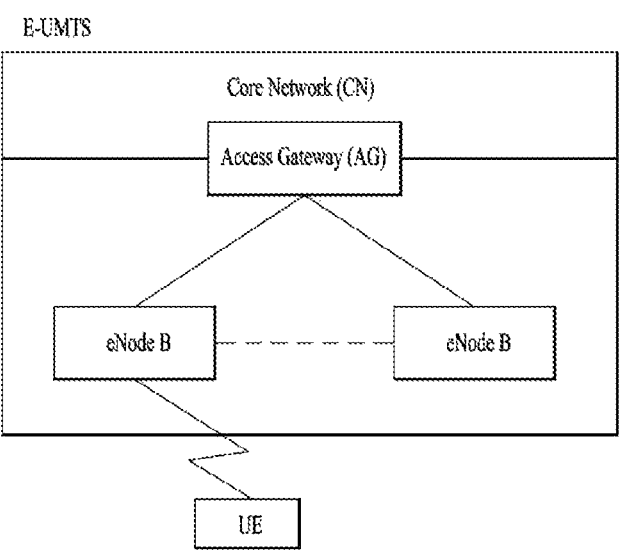
FIG. 1 is a diagram showing a network structure of an Evolved Universal Mobile Telecommunications System (E-UMTS) as an example of a wireless communication system.

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downl ink, UL and DL service level charging, gating and rate enforcement, DL rate enforcement based on APN-AMBR. For clarity ME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 3, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

FIG. 4 is a block diagram of a communication apparatus according to an embodiment of the present invention.

The apparatus shown in FIG. 4 can be a user equipment (UE) and/or eNB adapted to perform the above mechanism, but it can be any apparatus for performing the same operation.

As shown in FIG. 4, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 4 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 4 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

FIG. 5 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 6 is a conceptual diagram for a PDCP entity architecture.

FIG. 6 represents one possible structure for the PDCP sublayer, but it should not restrict implementation. Each RB (i.e. DRB and SRB, except for SRB0) is associated with one PDCP entity. Each PDCP entity is associated with one or two (one for each direction) RLC entities depending on the RB characteristic (i.e. unidirectional or bi-directional) and RLC mode. The PDCP entities are located in the PDCP sublayer. The PDCP sublayer is configured by upper layers.

FIG. 7 is a conceptual diagram for functional view of a PDCP entity.

The PDCP entities are located in the PDCP sublayer. Several PDCP entities may be defined for a UE. Each PDCP entity carrying user plane data may be configured to use header compression. Each PDCP entity is carrying the data of one radio bearer. In this version of the specification, only the robust header compression protocol (ROHC), is supported. Every PDCP entity uses at most one ROHC compressor instance and at most one ROHC decompressor instance. A PDCP entity is associated either to the control plane or the user plane depending on which radio bearer it is carrying data for.

FIG. 7 represents the functional view of the PDCP entity for the PDCP sublayer; it should not restrict implementation. The figure is based on the radio interface protocol architecture.

At reception of a PDCP service data unit (SDU) from upper layers, the UE may start a discardTimer associated with this PDCP SDU. A transmitting side of each PDCP entity for DRBs may maintain the discardTimer. The duration of the discardTimer is configured by upper layers. In the transmitter, a new timer is started upon reception of a PDCP SDU from an upper layer. For a PDCP SDU received from upper layers, the UE may associate the PDCP sequence number (SN) corresponding to Next_PDCP_TX_SN to the PDCP SDU, perform header compression of the PDCP SDU, perform integrity protection and ciphering using COUNT based on TX_HFN and the PDCP SN associated with this PDCP SDU, increment the Next_PDCP_TX_SN by one, and submit the resulting PDCP Data PDU to lower layer. If the Next_PDCP_TX_SN is greater than Maximum_PDCP_SN, the Next_PDCP_TX_SN is set to '0' and TX_HFN is incremented by one.

When the discard timer expires for a PDCP SDU, or the successful delivery of a PDCP SDU is confirmed by PDCP status report, the UE may discard the PDCP SDU along with the corresponding PDCP PDU. If the corresponding PDCP PDU has already been submitted to lower layers the discard is indicated to lower layers. The transmitting side of each PDCP entity for DRBs may maintain the discard timer. The duration of the timer is configured by upper layers. In the transmitter, a new timer is started upon reception of an SDU from upper layer.

FIG. 8 is a diagram for MAC structure overview in a UE side.

The MAC layer handles logical-channel multiplexing, hybrid-ARQ retransmissions, and uplink and downlink scheduling. It is also responsible for multiplexing/demultiplexing data across multiple component carriers when carrier aggregation is used.

The MAC provides services to the RLC in the form of logical channels. The MAC entity shall perform Logical Channel Prioritization procedure when a new transmission is performed.

Meanwhile, to al low a scheduler to determine the amount of resources to grant to each terminal in future subframes, information about the buffer situation is useful.

From a scheduling perspective, buffer information for each logical channel is beneficial, although this could result in a significant overhead. Logical channels are therefore grouped into logical-channel groups and the reporting is done per group. The buffer-size field in a buffer-status report indicates the amount of data available transmission across all logical channels in a logical-channel group.

The Buffer Status Reporting (BSR) procedure is used to provide a serving eNB with information about the amount of DAT in the UL buffers of the UE. RRC may control BSR reporting by configuring the three timers periodic BSR-Timer and retxBSR-Timer and logicalChannelSR-Prohibit-Timer and by, for each logical channel, optionally signaling Logical Channel Group (LCG) which allocates the logical channel to an LCG.

A logical channel is defined by the type of information it carries and is generally classified as a control channel, used for transmission of control and configuration information necessary for operating an LTE system, or as a traffic channel, used for the user data. The set of logical-channel types specified for LTE includes:

- The Broadcast Control Channel (BCCH), used for transmission of system information from the network to all terminals in a cell. Prior to accessing the system, a terminal needs to acquire the system information to find out how the system is configured and, in general, how to behave properly within a cell.
- The Paging Control Channel (PCCH), used for paging of terminals whose location on a cell level is not known to the network. The paging message therefore needs to be transmitted in multiple cells.
- The Common Control Channel (CCCH), used for transmission of control information in conjunction with random access.
- The Dedicated Control Channel (DCCH), used for transmission of control information to/from a terminal. This channel is used for individual configuration of terminals such as different handover messages.
- The Multicast Control Channel (MCCH), used for transmission of control information required for reception of the MTCH.

The Dedicated Traffic Channel (DTCH), used for transmission of user data to/from a terminal. This is the logical channel type used for transmission of all uplink and non-MBSFN downlink user data.

The Multicast Traffic Channel (MTCH), used for downlink transmission of MBMS services.

FIG. 9A is a conceptual diagram for Logged MDT, and FIG. 9B is a conceptual diagram for Immediate MDT.

In wireless mobile networks quality of user experience changes dynamically and depends on large variety of factors. Because of that mobile operators are willing to timely and effectively evaluate provided Quality of Service (QoS) in their networks. Nowadays the main tool for monitoring network state and performance is drive testing. To replace this expensive and mostly manual procedure, concept of Minimization of Drive Tests (MDT) is being developed in 3GPP LTE standardization.

MDT is about UE measurement collection for off-line processing. No automatic mechanism is defined MDT. The MDT mode includes 2 modes for MDT measurements: Logged MDT and Immediate MDT.

The Immediate MDT is that a MDT functionality involving measurements performed by the UE in CONNECTED state and reporting of the measurements to eNB/radio network controller (RNC) available at the time of reporting condition as well as measurements by the network for MDT purposes. The Logged MDT is a MDT functionality involving measurement logging by UE in IDLE mode, CELL_paging channel (CELL_PCH), UTRAN registration area_PCH (URA_PCH) states and CELL_forward access channel (CELL_FACH) state when second DRX cycle is used (when UE is in UTRA) for reporting to eNB/RNC at a later point in time, and logging of MBSFN measurements by E-UTRA UE in IDLE and CONNECTED modes.

MDT measurements may include packet delay measurement, packet discard rate measurement, and packet loss rate measurement.

Packet Delay in DL per QCI refers to packet delay for DRBs. The objective of this measurement is to measure L2 Packet Delay for operations and maintenance (OAM) performance observability or for QoS verification of MDT. For arrival of packets the reference point is PDCP upper service access point (SAP). For successful reception the reference point is MAC lower SAP. The Detailed Definition and explanations of the Packet Delay in DL per QCI can be found in Math FIG. 1 and Table 1 below.

$$M(T, qci) = \left\lfloor \frac{\sum_{\forall i} tAck(i) - tArriv(i)}{I(T)} \right\rfloor \quad \text{[Math figure 1]}$$

TABLE 1

| | |
|---|---|
| M(T, qci) | Packet Delay in the DL per QCI, averaged during time period T. Unit: Integer ms. |
| tArriv(i) | The point in time when PDCP SDU i arrives. |
| tAck(i) | The point in time when the last piece of PDCP SDU i was received by the UE according to received HARQ feedback information. |
| i | A PDCP SDU that arrives at the PDCP upper SAP during time period T. PDCP SDU for which HARQ acknowledgement is not received for all parts shall not be included in the calculation. |
| I(T) | Total number of PDCP SDUs i. |
| T | Time Period during which the measurement is performed |

Packet Discard Rate in DL per QCI refers to discard for DRBs. The objective of this measurement is to measure packets that are dropped due to congestion, traffic management etc, for OAM performance observability. One packet corresponds to one PDCP SDU. The reference point is PDCP upper SAP. The Detailed Definition and explanations of the Packet Discard Rate in DL per QCI can be found in Math FIG. 2 and Table 2 below.

$$M(T, qci) = \left\lfloor \frac{Ddisc(T, qci) * 1000000}{N(T, qci)} \right\rfloor \quad \text{[Math figure 2]}$$

TABLE 2

| | |
|---|---|
| M(T, qci) | Packet Discard Rate in the DL per QCI, averaged during time period T. Unit: number of discarded packets per received packets * $10^6$, Integer. |
| Ddisc(T, qci) | Number of DL packets, for which no part has been transmitted over the air, of a data radio bearer with QCI = qci, that are discarded during time period T in the PDCP, RLC or MAC layers due to reasons other than hand-over. |
| N(T, qci) | Number of DL packets of bearer with QCI = qci that has entered PDCP upper SAP during time period T (NOTE). |
| T | Time Period during which the measurement is performed, Unit: minutes (NOTE). |

It is noted that packet loss is expected to be small or very small. The statistical accuracy of an individual discard rate measurement result is dependent on how many packets has been received, and thus the time for the measurement.

Packet Uu Loss Rate in DL per QCI refers to packet loss for DRBs. The objective of this measurement is to measure packets that are lost at Uu transmission, for OAM performance observability. One packet corresponds to one PDCP SDU. The Detailed Definition and explanations of the Packet Uu Loss Rate in DL per QCI can be found in Math FIG. 3 and Table 3 below.

$$M(T, qci) = \left\lfloor \frac{Dloss(T, qci) * 1000000}{N(T, qci) + Dloss(T, qci)} \right\rfloor \quad \text{[Math figure 3]}$$

TABLE 3

| | |
|---|---|
| M(T, qci) | Packet Uu Loss Rate in the DL per QCI. Unit: number of lost packets per transmitted packets * $10^6$, Integer. |
| Dloss(T, qci) | Number of DL packets, of a data radio bearer with QCI = qci, for which at least a part has been transmitted over the air but not positively acknowledged, and it was decided during time period T that no more transmission attempts will be done. If transmission of a packet might continue in another cell, it shall not be included in this count. |
| N(T, qci) | Number of DL packets, of a data radio bearer with QCI = qci, which has been transmitted over the air and positively acknowledged during time period T. |
| T | Time Period during which the measurement is performed, Unit: minutes (NOTE). |

It is noted that packet loss is expected to be upper bounded by the Packet Error Loss Rate (PELR) of the QCI which takes values between $10^{-6}$ and $10^{-2}$. The statistical accuracy of an individual packet loss rate measurement result is dependent on how many packets have been received, and thus the time for the measurement.

Packet Loss Rate in UL per QCI refers to packet loss for DRBs. The objective of this measurement is to measure packets that are lost in the UL, for OAM performance observability. One packet corresponds to one PDCP SDU. Reference point is the PDCP upper SAP. The Detailed Definition and explanations of the Packet Loss Rate in UL per QCI can be found in Math FIG. 4 and Table 4 below.

$$M(T, qci) = \left\lfloor \frac{Dloss(T, qci) * 1000000}{N(T, qci)} \right\rfloor \quad \text{[Math figure 4]}$$

TABLE 4

| | |
|---|---|
| M(T, qci) | Packet Loss Rate in the UL per QCI. Unit: number of lost packets per transmitted packets * $10^6$, Integer. |
| Dloss(T, qci) | Number of missing UL PDCP sequence numbers, representing packets that are not delivered to higher layers, of a data radio bearer with QCI = qci during time period T. If transmission of a packet might continue in another cell, it shall not be included in this count. |
| N(T, qci) | Total number of UL PDCP sequence numbers (also including missing sequence numbers) of a bearer with QCI = qci, starting from the sequence number of the first packet delivered by PDCP upper SAP to higher layers until the sequence number of the last packet during time period T. |
| T | Time Period during which the measurement is performed, Unit: minutes (NOTE). |

It is noted that packet loss is expected to be upper bounded by the PELR of the QCI which takes values between $10^{-6}$ and $10^{-2}$. The statistical accuracy of an individual packet loss rate measurement result is dependent on how many packets have been received, and thus the time for the measurement.

Meanwhile, measurements in MDT, such as measurements discussed above, are performed separately per QoS Class Identifier (QCI). QCI defines a Quality of Service (QoS) level for a radio bearer so that the radio bearers with the same QCI would be treated in a similar way regardless of manufacturers/operators. More detailed explanations of QCI will be described with reference to FIGS. 10A and 10B.

FIG. 10A shows scope of the Standardized QCI characteristics for client/server communication, and FIG. 10B shows scope of the Standardized QCI characteristics for peer/peer communication.

Standardized characteristics associated with standardized QCI values are specified. The characteristics describe the packet forwarding treatment that a service data flow (SDF) aggregate receives edge-to-edge between the UE and the Policy and Charging Enforcement Function (PCEF) (as shown in FIGS. 10A and 10B) in terms of the following performance characteristics: i) Resource Type (guaranteed bit rate (GBR) or Non-GBR); ii) Priority; iii) Packet Delay Budget; and iv) Packet Error Loss Rate.

Here, a GBR bearer means an IP connectivity access network (CAN) bearer with reserved (guaranteed) bitrate resources, and a non-GBR bearer means an IP CAN bearer with no reserved (guaranteed) bitrate resources.

The standardized characteristics are not signalled on any interface. They should be understood as guidelines for the pre-configuration of node specific parameters for each QCI. The goal of standardizing a QCI with corresponding characteristics is to ensure that applications/services mapped to that QCI receive the same minimum level of QoS in multi-vendor network deployments and in case of roaming. A standardized QCI and corresponding characteristics is independent of the UE's current access (3GPP or Non-3GPP). The one-to-one mapping of standardized QCI values to standardized characteristics is captured in table 5 below.

TABLE 5

| QCI | Resource Type | Priority Level | Packet Delay Budget | Packet Error Loss Rate (NOTE 2) | Example Services |
|---|---|---|---|---|---|
| 1 (NOTE 3) | GBR | 2 | 100 ms (NOTE 1, NOTE 11) | $10^{-2}$ | Conversational Voice |
| 2 (NOTE 3) | | 4 | 150 ms (NOTE 1, NOTE 11) | $10^{-3}$ | Conversational Video (Live Streaming) |
| 3 (NOTE 3) | | 3 | 50 ms (NOTE 1, NOTE 11) | $10^{-3}$ | Real Time Gaming |
| 4 (NOTE 3) | | 5 | 300 ms (NOTE 1, NOTE 11) | $10^{-6}$ | Non-Conversational Video (Buffered Streaming) |
| 65 (NOTE 3, NOTE 9) | | 0.7 | 75 ms (NOTE 7, NOTE 8) | $10^{-2}$ | Mission Critical user plane Push To Talk voice (e.g., MCPTT) |
| 66 (NOTE 3) | | 2 | 100 ms (NOTE 1, NOTE 10) | $10^{-2}$ | Non-Mission-Critical user plane Push To Talk voice |
| 5 (NOTE 3) | Non-GBR | 1 | 100 ms (NOTE 1, NOTE 10) | $10^{-6}$ | IMS Signalling |
| 6 (NOTE 4) | | 6 | 300 ms (NOTE 1, NOTE 10) | $10^{-6}$ | Video (Buffered Streaming) TCP-based (e.g., www, e-mail, chat, ftp, p2p file sharing, progressive video, etc.) |
| 7 (NOTE 3) | | 7 | 100 ms (NOTE 1, NOTE 10) | $10^{-3}$ | Voice, Video (Live Streaming) Interactive Gaming |

TABLE 5-continued

| QCI | Resource Type | Priority Level | Packet Delay Budget | Packet Error Loss Rate (NOTE 2) | Example Services |
|---|---|---|---|---|---|
| 8 (NOTE 5) | | 8 | 300 ms (NOTE 1) | $10^{-6}$ | Video (Buffered Streaming) TCP-based (e.g., www, e-mail, chat, ftp, p2p file sharing progressive video, etc.) |
| 9 (NOTE 6) | | 9 | | | |
| 69 (NOTE 3, NOTE 9) | | 0.5 | 60 ms (NOTE 7, NOTE 8) | $10^{-6}$ | Mission Critical delay sensitive signalling (e.g., MC-PTT signalling) |
| 70 NOTE 4) | | 5.5 | 200 ms (NOTE 7, NOTE 10) | $10^{-6}$ | Mission Critical Data (e.g. example services are the same as QCI 6/8/9) |

More specific description regarding Table 5 is specified in TS 23.203 version 13.4.0.

*107 Meanwhile, as discussed above, measurements in MDT such as packet delay measurement, packet discard rate measurement, and packet loss rate measurement discussed above are performed separately per QCI.

However, a UE does not receive any QCI related configuration from an eNB. When the eNB establishes at least one or more radio bearers to provide user plane service, the UE is configured with a dedicated radio resource configuration in a RRC message (e.g., RRCConnectionReconfiguration message, wherein the RRCConnectionReconfiguration is the command to modify an RRC connection, and may convey information for measurement configuration, mobility control, and radio resource configuration).

Table 6 shows RadioResourceConfigDedicated information element (IE) included in the RRCConnectionReconfiguration message, and Table 7 shows LogicalChannelConfig IE included in the RadioResourceConfigDedicated IE. The RadioResourceConfigDedicated IE in Table 6 is used to setup/modify/release RBs, to modify the MAC main configuration, to modify the SPS configuration and to modify dedicated physical configuration. The LogicalChannelConfig IE in Table 7 is used to configure the logical channel parameters.

Each field in Tables 6 and 7 is specified in TS 36.331 version 12.6.0. For example, in Table 6, logicalChannelConfig is used to indicate whether the logical channel configuration is signalled explicitly or set to the default logical channel configuration for SRB1 or SRB2. logicalChannelIdentity indicates a logical channel identity for both UL and DL. In Table 7, logicalChannelGroup is for mapping of logical channel to logical channel group for BSR reporting. Priority indicates Logical channel priority in TS 36.321 version 12.5.0.

TABLE 6

RadioResourceConfigDedicated information element

```
-- ASN1START
RadioResourceConfigDedicated ::=       SEQUENCE {
    srb-ToAddModList                   SRB-ToAddModList            OPTIONAL,    -- Cond HO-Conn
    drb-ToAddModList                   DRB-ToAddModList            OPTIONAL,    -- Cond HO-toEUTRA
    drb-ToReleaseList                  DRB-ToReleaseList           OPTIONAL,    -- Need ON
    mac-MainConfig                     CHOICE {
        explicitValue                      MAC-MainConfig,
        defaultValue                       NULL
    }                                  OPTIONAL,                                -- Cond HO-
toEUTRA2
    sps-Config                         SPS-Config                  OPTIONAL,    -- Need ON
    physicalConfigDedicated            PhysicalConfigDedicated     OPTIONAL,    -- Need ON
    ...,
    [[  rlf-TimersAndConstants-r9      RLF-TimersAndConstants-r9               OPTIONAL     -- Need ON
    ]],
    [[  measSubframePatternPCell-r10MeasSubframePatternPCell-r10               OPTIONAL     -- Need ON
    ]],
    [[  neighCellsCRS-Info-r11         NeighCellsCRS-Info-r11                  OPTIONAL     -- Need ON
    ]],
    [[  naics-Info-r12                 NAICS-AssistanceInfo-r12                OPTIONAL     -- Need ON
    ]]}
    RadioResourceConfigDedicatedPSCell-r12 ::=      SEQUENCE {
        -- UE specific configuration extensions applicable for an PSCell
        physicalConfigDedicatedPSCell-r12      PhysicalConfigDedicated     OPTIONAL,    -- Need ON
        sps-Config-r12                         SPS-Config                  OPTIONAL,    -- Need ON
        naics-Info-r12                         NAICS-AssistanceInfo-r12    OPTIONAL,    -- Need ON
        ...
    }
    RadioResourceConfigDedicatedSCG-r12 ::=         SEQUENCE {
        drb-ToAddModListSCG-r12                DRB-ToAddModListSCG-r12     OPTIONAL,    -- Need ON
        mac-MainConfigSCG-r12                  MAC-MainConfig              OPTIONAL,    -- Need ON
        rlf-TimersAndConstantsSCG-r12          RLF-TimesAndConstantsSCG-r12 OPTIONAL,   -- Need ON
        ...
    }
```

TABLE 6-continued

RadioResourceConfigDedicated information element

```
RadioResourceConfigDedicatedSCell-r10 ::=        SEQUENCE: {
    -- UE specific configuration extensions applicable for an SCell
    physicalConfigDedicatedSCell-r10      PhysicalConfigDedicatedSCell-r10                    OPTIONAL, -- Need ON
    ...,
    [[  mac-MainConfigSCell-r11           MAC-MainConfigSCell-r11       OPTIONAL        -- Cond SCellAdd
    ]],
    [[  naics-Info-r12                    NAICS-AssistanceInfo-r12      OPTIONAL        -- Need ON
    ]]
}
SRB-ToAddModList ::=                      SEQUENCE (SIZE (1..2)) OF SRB-ToAddMod
SRB-ToAddMod ::= SEQUENCE {
    srb-Identity                          INTEGER (1..2),
    rlc-Config                            CHOICE {
        explicitValue                         RLC-Config,
        defaultValue                          NULL
    }        OPTIONAL,                                                                 -- Cond Setup
    logicalChannelConfig                  CHOICE {
        explicitValue                         LogicalChannelConfig,
        defaultValue                          NULL
    }        OPTIONAL,                                                                 -- Cond Setup
    ...
}
DRB-ToAddModList ::=                      SEQUENCE (SIZE (1..maxDRB)) OF DRB-ToAddMod
DRB-ToAddModListSCG-r12 ::=               SEQUENCE (SIZE (1..maxDRB)) OF DRB-ToAddModListSCG-r12
DRB-ToAddMod ::= SEQUENCE {
    eps-BearerIdentity                    INTEGER (0..15)               OPTIONAL,       -- Cond DRB-Setup
    drb-Identity                          DRB-Identity,
    pdcp-Config                           PDCP-Config                   OPTIONAL,       -- Cond PDCP
    rlc-Config                            RLC-Config                    OPTIONAL,       -- Cond SetupM
    logicalChannelIdentity                Integer (3..10)               OPTIONAL,       -- Cond DRB-SetupM
    logicalChannelConfig                  LogicalChannelConfig          OPTIONAL,       -- Cond SetupM
    ...,
    [[  drb-TypeChange-r12                    ENUMERATED {toMCG}        OPTIONAL,       -- Need OP
        rlc-Config-v1250                      RLC-Config-v1250          OPTIONAL        -- Need ON
    ]]
}
DRB-ToAddModSCG-r12 ::= SEQUENCE {
    drb-Identity-r12                      DRB-Identity,
    drb-Type-r12                          CHOICE {
        split-r12                             NULL,
        scg-r12                               SEQUENCE {
            eps-BearerIdentity-r12                INTEGER (0..15)       OPTIONAL,       -- Cond DRB-Setup
            pdcp-Config-r12                       PDCP-Config           OPTIONAL,       -- Cond PDCP-S
        }
    }                                                                   OPTIONAL,       -- Cond SetupS2
    rlc-ConfigSCG-r12                     RLC-Config                    OPTIONAL,       -- Cond SetupS
    rlc-Config-v1250                      RLC-Config-v1250              OPTIONAL,       -- Need ON
    logicalChannelIdentitySCG-r12         INTEGER (3..10)               OPTIONAL,       -- Cond DRB-SetupS
    logicalChannelConfigSCG-r12           LogicalChannelConfig          OPTIONAL,       -- Cond SetupS
    ...
}
DRB-ToReleaseList ::=                     SEQUENCE (SIZE (1..maxDRB)) OF DRB-Identity
MeasSubframePatternPCell-r10 ::=              CHOICE {
    release                                   NULL,
    setup                                     MeasSubframePattern-r10
}
NeighCellsCRS-Info-r11 ::=                CHOICE {
    release                               NULL,
    setup                                 CRS-AssistanceInfoList-r11
)
CRS-AssistanceInfoList-r11 ::= SEQUENCE (SIZE (1..maxCellReport)) OF CRS-AssstanceInfo-r11
CRS-AssistanceInfo-r11 ::= SEQUENCE {
    physCellId-r11                        PhysCellId,
    antennaPortsCount-r11                 ENUMERATED (an1, an2, an4, spare1},
    mbsfn-SubframeConfigList-r11          MBSFN-SubframeConfigList,
    ...
}
NAICS-AssistanceInfo-r12 ::=              CHOICE {
    release                               NULL,
    setup                                 SEQUENCE {
        neighCellsToReleaseList-r12           NeighCellsToReleaseList-r12                     OPTIONAL,    -- Need ON
        neighCellsToAddModList-r12            NeighCellsToAddModList-r12                      OPTIONAL,    -- Need ON
        servCellp-a-r12                       P-a                                             OPTIONAL     -- Need ON
    }
}
```

TABLE 6-continued

RadioResourceConfigDedicated information element

```
NeighCellsToRe:leaseList-r12 ::=SEQUENCE (SIZE (1. .maxNeighCell-r12)) OF PhysCellId
NeighCellsToAddModList-r12 ::=          SEQUENCE (SIZE (1..maxNeighCell-r12)) OF
NeighCellsInfo-r12
NeighCellsInfo-r12          ::=              SEQUENCE {
    physCellId-r12                  PhysCellId,
    p-b-r12                         INTEGER (0..3),
    crs-PortsCount-r12              ENUMERATED (n1, n2, n4, spare},
    mbsfn-SubframeConfig-r12        MBSFN-SubframeConfigList            OPTIONAL,    -- Need ON
    p-aList-r12                     SEQUENCE (SIZE (1..maxP-a-PerNeighCell-r12)) OF P-a.
    transmissionModeList-r12        BIT STRING (SIZE(8)),
    resAllocGranularity-r12         INTEGER (1..4),
    ...
}
P-a ::= ENUMERATED { dB-6, dB-4dot77, dB-3, dB-1dot77,
                                dB0, dB1, dB2, dB3}
-- ASN1STOP
```

TABLE 7

LogicalChannelConfig information element

```
-- ASN1START
LogicalChannelConfig ::=             SEQUENCE {
    ul-Specificparameters              SEQUENCE {
        priority                         INTEGER (1..16),
        prioritisedBitRate               ENUMERATED {
                                           kBps0, kBps8, kBps16, kBps32, kBps64, kBps128,
                                           kBps256, infinity, kBps512-v1020, kBps1024-v1020,
                                           kBps2048-v1020, spare5, spare4, spare3, spare2,
                                           spare1},
        bucketSizeDuration               ENUMERATED {
                                           ms50, ms100, ms150, ms300, ms500, ms1000, spare2,
                                           spare1},
        logicalChannelGroup              NTEGER (0..3)     OPTIONAL      -- Need OR
    }   OPTIONAL,                                                        -- Cond UL
    ....,
    [[  logicalChannelSR-Mask-r9         ENUMERATED {setup} OPTIONAL   -- Cond SRmask
    ]],
    [[  logicalChannelSR-Prohibit-r12    BOOLEAN            OPTIONAL   -- Need ON
    ]]
}
-- ASN1ST0P
```

As shown in Tables 6 and 7, there is no information about QCI field in RRC message, and the UE is not configured with the QCI of corresponding bearer. Thus, it is impossible for the UE to report an UL packet delay measurement and an UL packet discard rate measurement per QCI to the eNB. Therefore, new criteria of reporting the UL packet delay measurement and the UL packet discard measurement needs to be defined.

FIG. 11 is conceptual diagram for a UE operation regarding UL Packet Measurement report according to an exemplary embodiment of the present invention.

In order to report measurement in MDT, it is invented that when a UE reports UL packet measurements (e.g. UL packet delay measurement and UL packet discard rate measurement) to the eNB, the UE reports the UL Packet Measurement Report per Radio Bearer (RB), per logical channel priority (LCP), or per logical channel group (LCG).

The UE is configured with UL Packet Measurement Report by the eNB by receiving an RRC message with MDT measurement configuration which may include a measurement period and a reporting unit. The measurement period indicates time interval of UL packet measurements. It is defined as number of subframes, number of radio frames, or absolute time interval. The reporting unit indicates unit of the UL Packet Measurement Report. It is defined as RB, LCP, or LCG. The UE transmits the UL Packet Measurement Report which may include Identifier of the Reporting Unit, UL packet delay of Reporting Unit, and UL packet discard rate of the Reporting Unit to the eNB.

Referring to FIG. 11, the UE receives a measurement configuration including a measurement period and a report unit from an eNB (S1101). The report unit corresponds to one of a RB, a LCP or a LCG.

When the UE receives a measurement configuration, the UE performs an UL Packet Measurement per the report unit using the measurement period (S1103). The UL Packet Measurement includes at least one of packet delay measurement or packet discard rate measurement.

For example, when the report unit corresponds to a RB, the UE performs the packet delay measurement and/or the packet discard rate measurement per RB using the measurement period. Or, when the report unit corresponds to a LCP, the UE performs the packet delay measurement and/or the packet discard rate measurement per LCP using the measurement period. Or, when the report unit corresponds to a LCG, the UE performs the packet delay measurement and/or the packet discard rate measurement per LCG using the measurement period.

After the UE performed the UL Packet Measurement, the UE generates an UL Packet Measurement report including at least one ID of the report unit and at least one result of the UL Packet Measurement corresponding to the at least one ID of the report unit (S1105).

For example, when the report unit corresponds to a RB, the UE generates an UL Packet Measurement report including at least one ID of RB(s) and at least one result of the UL Packet Measurement for the RB(s). Or, when the report unit corresponds to a LCP, the UE generates an UL Packet Measurement report including at least one ID of LCP(s) and at least one result of the UL Packet Measurement for the LCP(s). Or, when the report unit corresponds to a LCG, the UE generates an UL Packet Measurement report including at least one ID of LCG(s) and at least one result of the UL Packet Measurement for the LCG(s).

After that, the UE transmits the UL Packet Measurement report to the eNB (S1107).

Meanwhile, the UL Packet Measurement report per RB discussed above can gives considerably accurate result. However, in some cases, it is more efficient way in view of signalling overhead to report UL Packet Measurement per LCG. An example for an UL Packet Measurement report per LCG will be showed in FIG. 12.

FIG. 12 is conceptual diagram for a UE operation regarding UL Packet Measurement report per LCG according to an exemplary embodiment of the present invention.

Referring to FIG. 12, the UE receives a measurement configuration including a measurement period from an eNB (S1201). A report unit corresponding to a LCG may be included in the measurement configuration. The report unit may indicate that packet measurement should be performed per LCG.

The UE performs an UL Packet Measurement per LCG using the measurement period (S1203). The UL Packet Measurement includes at least one of packet delay measurement or packet discard rate measurement.

The packet delay measurement may be performed based on packet delays of packet data convergence protocol service data units (PDCP SDUs) from a set of RBs belonging to a LCG among a plurality of LCGs. The set of RBs are at least part of a plurality of RBs configured for the UE, and each of the plurality of RBs is associated with one of the plurality of LCGs. Here, each of the set of RBs has at least one PDCP SDU whose packet delay may be above a threshold during the measurement period. Or, each of packet delays of the set of RBs may be above a threshold during the measurement period. More specific description about the packet delay measurement will be discussed in FIGS. 13 to 15.

The packet discard rate measurement may be performed based on a number of discarded PDCP SDUs from a set of RBs belonging to a LCG among a plurality of LCGs. The set of RBs are at least part of a plurality of RBs configured for the UE, and each of the plurality of RBs is associated with one of the plurality of LCGs. Here, each of packet discard rates of the set of RBs may be above a threshold during the measurement period. More specific description about the packet discard rate measurement will be discussed in FIGS. 13 to 15.

After that, the UE generates an UL Packet Measurement report including at least one ID of a plurality of LCGs and at least one result of the UL Packet Measurement corresponding to the at least one ID of the plurality of LCGs (S1205), and transmits the UL Packet Measurement report to the eNB (S1207).

More specific examples for an UL Packet Measurement report per RB, LCP or LCG will be showed in FIGS. 13 to 15.

FIG. 13 shows an example of an UL Packet Measurement report per RB according to an exemplary embodiment of the present invention.

When the UE performs UL packet delay measurement per RB, the UE calculates UL packet delays for each PDCP SDU by recording the time duration between a time point when a PDCP SDU arrives at PDCP entity (e.g., PDCP upper SAP) and a time point when the first part of this PDCP SDU is delivered to lower layer (e.g., MAC entity) for each PDCP SDU. Then the UE sums up UL packet delays of all PDCP SDUs from a RB during a measurement period, and obtains UL packet delay of the RB by dividing the summing result by the number of PDCP SDUs from the RB.

When the UE performs UL packet discard rate measurement per RB, the UE records the number of PDCP SDUs from a RB that are discarded due to expiry of a discard timer during the measurement period. The UE counts the number of discarded PDCP SDUs from the RB during the measurement period, and obtains UL packet discard rate of the RB by dividing the counting result by the number of PDCP SDUs from the RB.

For each measurement period, the UE may transmit an UL Packet Measurement Report per RB, i) if the UE receives a message (e.g., a RRC signal, a PDCP control PDU, a MAC control element, or a PHY signal) which requests UL Packet Measurement Report, or ii) if UL packet delay of a PDCP SDU is above a threshold (received by RRC signal or pre-defined), or iii) if UL packet delay of a RB is above a threshold (received by RRC signal or pre-defined), or iv) if UL packet discard rate of a RB is above a threshold (received by RRC signal or pre-defined).

The UE may construct a UL Packet Measurement Report by including at least one set of followings: i) an ID of a RB and ii) an UL packet delay of the RB and/or an UL packet discard rate of the RB.

In the UL Packet Measurement Report, the UE includes one of following RBs (and corresponding UL packet measurement results): i) All RBs, or ii) RBs having a PDCP SDU whose UL packet delay is above a threshold, or iii) RBs whose UL packet delay is above a threshold, or iv) RBs whose UL packet discard rate is above a threshold.

In descriptions with reference to FIG. 13, it is assumed that a UE is configured with 10 RBs, and one LCP and one LCG are respectively configured for each RB as Table 8 below.

TABLE 8

| RB | LCP | LCG |
|---|---|---|
| RB1 | LCP1 | LCG1 |
| RB2 | LCP1 | LCG1 |
| RB3 | LCP1 | LCG1 |
| RB4 | LCP2 | LCG3 |
| RB5 | LCP3 | LCG4 |
| RB6 | LCP3 | LCG3 |
| RB7 | LCP4 | LCG1 |
| RB8 | LCP3 | LCG2 |
| RB9 | LCP4 | LCG1 |
| RB10 | LCP4 | LCG1 |

It is also assumed that the UE is configured with UL Packet Measurement Report by the eNB with MDT measurement configuration including a measurement Period indicating 100 ms and a reporting unit indicating RB.

During the measurement period (100 ms), the UE calculates UL packet delays for each PDCP SDU by recording the time duration between a time point when a PDCP SDU arrives at PDCP entity (e.g., PDCP upper SAP) and a time point when the first part of this PDCP SDU is delivered to lower layer (e.g., MAC entity) for each PDCP SDU. Then the UE sums up UL packet delays of all PDCP SDUs from each RB (i.e., RB 1~RB 10 in FIG. 13) during the measurement period, and obtains UL packet delay of each RB by dividing the summing result by the number of PDCP SDUs from each RB. Assuming that values of the obtained UL packet delays of each of RB 1~RB 10 are as shown in Table 9 below.

TABLE 9

| RB | UL packet delay |
|---|---|
| RB1 | 110 |
| RB2 | 70 |
| RB3 | 200 |
| RB4 | 150 |
| RB5 | 90 |
| RB6 | 20 |
| RB7 | 300 |
| RB8 | 50 |
| RB9 | 240 |
| RB10 | 135 |

Then the UE may receive, by RRC signaling, a threshold value (e.g. the threshold value=90) of UL packet delay of a RB. The UE may construct a UL Packet Measurement Report including IDs of RBs whose UL packet delay is above the threshold and corresponding UL packet delays. In this case, IDs of RBs whose UL packet delay is above a threshold (i.e. RB1, RB 3, RB 4, RB 7, RB 9, RB 10) and corresponding UL packet delay measurements results (i.e., 110 (RB1), 200 (RB 3), 150 (RB 4), 300 (RB 7), 240 (RB 9), 135 (RB 10)) may be included in the UL Packet Measurement Report, as shown in FIG. 13. Then the UE transmits the UL Packet Measurement Report per RB to an eNB.

According to the present exemplary embodiment, the UE can report measurement result per RB to the eNB. Then, the eNB can obtain measurement result per QCI by collecting the UL measurement result for each RB.

FIG. 14 shows an example of an UL Packet Measurement report per LCP according to an exemplary embodiment of the present invention.

If a UE transmits UL packet delay/discard rate measurement reports for each radio bearer (RB), an eNB could have more accurate and detailed information about the UE's delay and discard rate. However, it would cause signaling overhead. Even if many RBs are configured with the UE, some of them may be configured with same LCP. By reporting the UL packet delay/discard rate measurements per LCP, the UE can reduce signaling overhead and increase reporting efficiency.

For performing UL packet delay measurement per LCP, the UE may calculate UL packet delays for each PDCP SDU by recording a time duration between a time point when a PDCP SDU arrives at PDCP upper SAP and a time point when the first part of this PDCP SDU is delivered to MAC for each PDCP SDU. Then the UE sums up UL packet delays of all PDCP SDUs from RBs with same LCP during a measurement period (i.e., logging duration), and obtains an UL packet delay of the same LCP by dividing the summing result by the number of PDCP SDUs from RBs with the same LCP.

Or, for performing UL packet delay measurement per LCP, the UE calculates an average of UL packet delay of each LCP using UL packet delays of RBs having a PDCP SDU whose UL packet delay is above a threshold. For each LCP, the UE sums up all of UL packet delays of RBs with same LCP having a PDCP SDU whose UL packet delay is above a threshold during the measurement period, and obtains an UL packet delay of the same LCP by dividing the summing result by the number of RBs with the same LCP.

Or, for performing UL packet delay measurement per LCP, the UE calculates an average of UL packet delay of each LCP using UL packet delays of RBs which is above a threshold. For each LCP, the UE sums up all of UL packet delays of RBs with same LCP which is above a threshold during the measurement period, and obtains an UL packet delay of the same LCP by dividing the summing result by the number of RBs with the same LCP.

For performing UL packet discard rate measurement per LCP, The UE records the number of PDCP SDUs that are discarded due to expiry of discard timer during the measurement period. The UE counts the number of discarded PDCP SDUs from RBs with same LCP during the measurement period, and obtains an UL packet discard rate of the same LCP by dividing the counting result by the number of PDCP SDUs from RBs with the same LCP.

Or, for performing UL packet discard rate measurement per LCP, the UE calculates an average of UL packet discard rate of each LCP using UL packet discard rates of RBs whose UL packet discard rate is above threshold. For each LCP, the UE sums up all of UL packet discard rates of RBs with same LCP whose UL packet discard rate is above a threshold during measurement period, and obtains an UL packet discard rate of the same LCP by dividing the summing result by the number of RBs with the same LCP.

After performing UL packet delay/discard rate measurements, the UE constructs a UL Packet Measurement Report per LCP by including at least one set of followings: i) an ID of a LCP, ii) an UL packet delay of the LCP and/or an UL packet discard rate of the LCP.

In descriptions with reference to FIG. 14, it is assumed that a UE is configured with 10 RBs, and one LCP and one LCG are respectively configured for each RB as above Table 8, and UL packet delay values of each RB are obtained as above Table 9.

It is also assumed that the UE is configured with UL Packet Measurement Report by the eNB with MDT measurement configuration including a measurement Period (100 ms) and a reporting unit (LCP).

The present exemplary embodiment with reference to FIG. 14 shows an example of the UL Packet Measurement Report per LCP of RBs whose UL Packet delay is above a threshold value. The present exemplary embodiment will be described with also reference to Tables 8 and 9.

During a measurement period, for each LCP, the UE sums up all of UL packet delays of RBs with same LCP whose UL packet delay is above the threshold value, and obtains an UL packet delay of the same LCP by dividing the summing result by the number of RBs with the same LCP whose UL packet delay is above the threshold value. Specifically, an UL packet delay of LCP 1 is determined as 155 (i.e., (UL packet delay of RB 1+UL packet delay of RB 3)/the number of RBs with LCP 1 whose UL packet delay is above 90=(110+200)/2=155). Similarly, an UL packet delay of LCP 2 is determined as 150 (i.e., UL packet delay of RB 4/the number of RBs with LCP 2 whose UL packet delay is above 90=150/1=150). Similarly, an UL packet delay of LCP 4 is determined as 225 (i.e., (UL packet delay of RB 7+UL packet delay of RB 9+UL packet delay of RB 10)/the number of RBs with LCP 4 whose UL packet delay is above 90=(300+240+135)/3=225).

Then the UE constructs and transmits an UL Packet Measurement Report including ID(s) of LCP(s) and UL packet delay(s) of the LCP(s). In the present exemplary embodiment, the UL Packet Measurement Report may include LCP 1, LCP 2, LCP 4, an UL packet delay of LCP 1 (i.e. 155), an UL packet delay of LCP 2 (i.e. 150), and an UL packet delay of LCP 4 (i.e. 225).

According to the present exemplary embodiment, it has less reporting overhead than an UL Packet Measurement report per RB. Moreover, it can also provide measurement result with sufficient accuracy, because a QCI is closely related to a LCP.

FIG. 15 shows an example of an UL Packet Measurement report per LCG according to an exemplary embodiment of the present invention.

It is possible to reduce signaling overhead by grouping logical channels to a LCG. As logical channels with same priority based on the QoS of the radio bearers can be grouped in to same LCG, by reporting the UL packet measurements (e.g. UL packet delay measurement and UL packet discard rate measurement) per LCG, the UE can report UL packet measurements more efficiently.

For performing UL packet delay measurement per LCG, the UE may calculate UL packet delays for each PDCP SDU by recording a time duration between a time point when a PDCP SDU arrives at PDCP entity (e.g., PDCP upper SAP) and a time point when the first part of this PDCP SDU is delivered to lower layer (e.g., MAC entity) for each PDCP SDU. Then the UE sums up UL packet delays of all PDCP SDUs from RBs with same LCG during a measurement period, and obtains an UL packet delay of the same LCG by dividing the summing result by the number of PDCP SDUs from RBs with the same LCG.

Or, for performing UL packet delay measurement per LCG, the UE calculates an average of UL packet delay of each LCG using UL packet delays of RBs having a PDCP SDU whose UL packet delay is above a threshold. For each LCG, the UE sums up all UL packet delays of RBs with same LCG having a PDCP SDU whose UL packet delay is above the threshold during the measurement period, and obtains the UL packet delay of the same LCG by dividing the summing result by the number of RBs with the same LCG.

Or, for performing UL packet delay measurement per LCG, the UE calculates an average of UL packet delay of each LCG using UL packet delays of RBs which is above a threshold. For each LCG, the UE sums up all of UL packet delays of RBs with same LCG which is above a threshold during the measurement period, and obtains an UL packet delay of the same LCG by dividing the summing result by the number of RBs with the same LCG.

Or, for performing UL packet delay measurement per LCG, the UE calculates an average of UL packet delay of each LCG using UL packet delays of LCPs. For each LCG, the UE sums up all the UL packet delays of LCPs having RBs whose UL packet delay is above a threshold during the measurement period, and obtains an UL packet delay of the same LCG by dividing the summing result by the number of LCPs with same LCG.

For performing UL packet discard rate measurement per LCG, the UE records the number of PDCP SDUs that are discarded due to expiry of discard timer during the measurement period. The UE counts the number of discarded PDCP SDUs from RBs with same LCG during the measurement period, and obtains the UL packet discard rate of the same LCG by dividing the counting result by the number of PDCP SDUs from RBs with the same LCG.

Or, for performing UL packet discard rate measurement per LCG, the UE calculates an average of UL packet discard rate of each LCG using UL packet discard rates of RBs whose UL packet discard rate is above a threshold. For each LCG, the UE sums up all UL packet discard rates of RBs with same LCG whose UL packet discard rate is above a threshold during the measurement period, and obtains an UL packet discard rate of the same LCG by dividing the summing result by the number of RBs with the same LCG.

Or, for performing UL packet discard rate measurement per LCG, the UE calculates an average of UL packet discard rate of each LCG using UL packet discard rates of LCPs. For each LCG, the UE sums up all UL packet discard rates of LCPs having RBs whose UL packet discard rate is above a threshold during the measurement period, and obtains an UL packet discard rate of a LCG by dividing summing result by the number of LCPs with same LCG.

After performing UL packet measurements, the UE constructs a UL Packet Measurement Report per LCG by including at least one set of followings: i) an ID of a LCG and ii) an UL packet delay of the LCG, and/or an UL packet discard rate of the LCG.

In descriptions with reference to FIG. 15, it is assumed that a UE is configured with 10 RBs, and one LCP and one LCG are respectively configured for each RB as above Table 8, and UL packet delay values of each RB are obtained as above Table 9.

It is also assumed that the UE is configured with UL Packet Measurement Report by the eNB with MDT measurement configuration including a measurement Period (100 ms) and a reporting unit (LCG).

The present exemplary embodiment with reference to FIG. 15 shows an example of the UL Packet Measurement Report per LCG of RBs whose UL Packet delay is above a threshold value. The present exemplary embodiment will be described with also reference to Tables 8 and 9.

During the Measurement Period (100 ms), for each LCG (i.e, LCG 1 and LCG 3 in FIG. 15), the UE sums up all the UL packet delay of LCPs associated with same LCG and having RBs whose UL packet delay is above a threshold (i.e. RB1, RB 3, RB 4, RB 7, RB 9, RB 10) during the measurement period, and obtains UL packet delays of each LCG by dividing the summing result by the number of LCPs with same LCG.

More specifically, an UL packet delay of LCG 1 is determined by summing UL packet delay of LCP 1 (155) and an UL packet delay of LCP 4 (225), and by dividing the summing result (380) by the number of LCPs (2) associated with LCG 1. As a results, the UL packet delay of LCG 1 is determined as 190 (i.e., (155+225)/2=190). Similarly, an UL packet delay of LCG 3 is determined as 150 (i.e., 150 (i.e., an UL packet delay of LCP 2)/1=150).

After that, the UE constructs a UL Packet Measurement Report including IDs of LCGs (i.e., an ID of LCG1 and an ID of LCG 3) and UL packet delays of each LCG (190 for LCG 1 and 150 for LCG 3), as shown in FIG. 15.

According to the present exemplary embodiment, it has less reporting overhead than performing an UL Packet Measurement report per RB.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a user equipment (UE) operating in a wireless communication system, the method comprising:
receiving a measurement configuration including a measurement period from a base station (BS);
configuring a plurality of radio bearers (RBs);
performing an UL Packet Measurement per logical channel group (LCG) during the measurement period;
generating an UL Packet Measurement report including at least one identifier (ID) of a plurality of LCGs and at least one result of the UL Packet Measurement corresponding to the at least one ID of the plurality of LCGs; and
transmitting the UL Packet Measurement report to the BS,
wherein the UL Packet Measurement includes a measurement of an UL packet delay of an LCG among the plurality of LCGs,
wherein the UL packet delay of the LCG is determined by averaging packet delays of logical channel priorities (LCPs) associated with the LCG, and
wherein UL packet delay of one of the LCPs is determined by averaging packet delays of RBs associated with the one LCP.

2. The method according to claim 1, wherein the UL Packet Measurement includes a packet discard rate measurement.

3. The method according to claim 2, wherein the packet discard rate measurement is performed based on a number of discarded PDCP SDUs from a set of RBs belonging to an LCG among the plurality of LCGs.

4. The method according to claim 3, wherein each of packet discard rates of the set of RBs is above a threshold during the measurement period.

5. The method according to claim 1, wherein the RBs associated with the one LCP has at least one packet data convergence protocol (PDCP) service data unit (SDU) whose packet delay is above a threshold during the measurement period.

6. The method according to claim 1, wherein each of the packet delays of the RBs is above a threshold during the measurement period.

7. A User Equipment (UE) for operating in a wireless communication system, the UE comprising:
a transmitter and a receiver; and
a processor operably coupled with the transmitter and the receiver and configured to:
control the receiver to receive a measurement configuration including a measurement period from a base station (BS),
configure a plurality of radio bearers (RBs),
perform an UL Packet Measurement per logical channel group (LCG) during the measurement period,
generate an UL Packet Measurement report including at least one identifier (ID) of a plurality of LCGs and at least one result of the UL Packet Measurement corresponding to the at least one ID of the LCGs, and
transmit the UL Packet Measurement report to the BS,
wherein the UL Packet Measurement includes a measurement of an UL packet delay of an LCG among the plurality of LCGs,
wherein the UL packet delay of the LCG is determined by averaging packet delays of logical channel priorities (LCPs) associated with the LCG, and
wherein UL packet delay of one of the LCPs is determined by averaging packet delays of RBs associated with the one LCP.

8. The UE according to claim 7, wherein the UL Packet Measurement includes discard rate measurement.

9. The UE according to claim 8, wherein the packet discard rate measurement is performed based on a number of discarded PDCP SDUs from a set of RBs belonging to an LCG among the plurality of LCGs.

10. The UE according to claim 9, wherein each of packet discard rates of the set of RBs is above a threshold during the measurement period.

11. The UE according to claim 7, wherein the RBs associated with the one LCP has at least one packet data convergence protocol (PDCP) service data unit (SDU) whose packet delay is above a threshold during the measurement period.

12. The UE according to claim 7, wherein each of the packet delays of the RBs is above a threshold during the measurement period.

\* \* \* \* \*